United States Patent Office 3,780,066
Patented Dec. 18, 1973

3,780,066
PREPARATION OF ALKENYL SUBSTITUTED HALOGENATED UNSATURATED POLYBASIC ACID ANHYDRIDES
Louis Schmerling, Riverside, Ill., assignor to Universal Oil Products Company, Des Plaines, Ill.
No Drawing. Filed Mar. 15, 1971, Ser. No. 124,578
Int. Cl. C07c 57/14, 61/16
U.S. Cl. 260—345.9
10 Claims

ABSTRACT OF THE DISCLOSURE

Alkenyl-substituted halogenated polybasic acid anhydrides are prepared by condensing an alkene containing at least 3 carbon atoms or a cycloalkene with polyhalo-substituted unsaturated polybasic acid anhydrides in the presence of free radical-generating compounds at elevated temperatures to produce the desired products.

This invention relates to a process for preparing alkenyl-substituted polybasic acid anhydrides and particularly to a process for preparing alkenyl-substituted halogenated unsaturated polybasic acid anhydrides. The products which may be prepared according to the process of this invention are useful in the chemical industry, particularly as intermediates in the preparation of plastics and polymers, the finished products possessing the desirable characteristics of flame retardancy greater than that which is possessed by polymers or plastics which do not contain, as one component thereof the products of the present invention. It is contemplated that the alkenyl-substituted halogenated unsaturated polybasic acid anhydrides which are prepared according to the process of this invention may be utilized as such, or may be further halogenated and particularly chlorinated or, they may be condensed with a diene such as butadiene and then with a polyhalo-substituted cyclopentadiene such as hexachlorocyclopentadiene to thus give an anhydride component of greater flame retardancy than that is obtained with maleic anhydride alone.

It is therefore an object of this invention to provide a process for preparing desirable chemical compositions of matter.

A further object of this invention is to provide a process for condensing certain alkenyl hydrocarbons with polyhalo-, and particularly polychloro-substituted unsaturated polybasic acid anhydrides to form the desired products.

In one aspect an embodiment of this invention resides in a process for the preparation of an alkenyl-substituted halogenated unsaturated polybasic acid anhydride which comprises reacting an alkene containing at least 3 carbon atoms or a cycloalkene with a polyhalo-substituted unsaturated polybasic acid anhydride characterized by the presence of at least one chlorine atom on each of the doubly-bonded carbon atoms in the presence of a free radical-generating compound at condensation conditions, and recovering the resultant alkenyl-substituted halogenated unsaturated polybasic acid anhydride.

A specific embodiment of this invention is found in the process for the preparation of alkenyl-substituted halogenated unsaturated polybasic acid anhydrides which comprises reacting propene with dichloromaleic anhydride in the presence of di-t-butyl peroxide at a temperature in the range of from about 50° to about 300° C. and at least as high as the decomposition temperature of said di-t-butyl peroxide and recovering the resultant 3-chloro-2-allylmaleic anhydride.

Other objects and embodiments will be found in the following further detailed description of the present invention.

As hereinbefore set forth, the present invention relates to a process for preparing alkenyl-substituted halogenated polybasic acid anhydrides. The process is effected by condensing an alkenyl compound containing at least 3 carbon atoms or a cycloalkenyl compound with a polyhalo-substituted unsaturated polybasic acid anhydride, the latter compound being characterized by the presence of a chlorine atom attached to each of the doubly-bonded carbon atoms in the unsaturated portion of the compound. The aforementioned condensation is brought about by the presence of a free radical-generating compound, which acts as an initiator for the reaction.

The initiators which are used in the process of this invention are those which are capable of forming a free radical under the reaction conditions hereinafter set forth in greater detail. These compounds which act to initiate the condensation reaction are free radical-generating compounds and will include diazonium compounds, metal-alkyls, and peroxy compounds. Suitable peroxy compounds contain the bivalent radical —O—O— which decomposes to form free radicals which initiate the general reaction of the present invention. Examples of such peroxy compounds are the persulfates, perborates and percarbonates of the alkali metals and ammonium; peracetic acid, persuccinic acid, dimethyl peroxide, diethyl peroxide, di-t-butyl peroxide, dipropyl peroxide, acetyl peroxide, propionyl peroxide, butyryl peroxide, lauroyl peroxide, benzoyl peroxide, Tetralin peroxide, urea peroxide, t-butyl perbenzoate, t-butyl hydroperoxide, methylcyclohexyl hydroperoxide, 2,4-dichlorobenzoyl peroxide, methyl ethyl ketone peroxide, cyclohexanone peroxide, cumene hydroperoxide, diisopropylbenzene hydroperoxide, paramenthane hydroperoxide, isopropyl percarbonate, etc. The organic peroxy compounds constitute a preferred class of initiator for use in this invention. Mixtures of peroxy compound catalysts may be employed or the peroxy compounds may be utilized in admixture with various diluents for the process of this invention. Thus organic peroxy compounds which are compounded commercially with various diluents for use as free radical-generating compounds may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with tricresyl phosphate, benzoyl peroxide compounded with dibutyl phthalate, methyl ethyl ketone peroxide in dimethyl phthalate, cyclohexanone peroxide compounded with dibutyl phthalate, acetyl peroxide in dimethyl phthalate, etc. Only catalytic amounts (less than stoichiometric amounts) need be used in the process.

In selecting the particular condensation temperature for use in the present invention, two considerations must be taken into account. First, sufficient energy by means of heating must be applied to the reaction system so that the reactants, namely, the alkenyl compound of the type hereinafter set forth in greater detail and the polyhalo-substituted unsaturated polybasic acid anhydride will be activated sufficiently for condensation to occur when free radicals are generated by the catalyst. Second, free radical-generating compounds such as peroxy compounds, and particularly organic peroxides, decompose a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free radical-generating compound decomposes smoothly with the generation of free radical at a half life which is not too long. In other words, sufficient free radicals must be present to induce the present chain reaction to take place, and these radicals must be formed at a temperature at which the reactants are in a suitable activated state for condensation. When the half life of the free radical-generating compound is greater than 10 hours, radicals are not generated at a sufficient rate to cause the reaction of the process of the present invention to go forward at a practical rate. Thus depending on the particular peroxide, the reaction temperature may be within the range of from about 50° to about 300° C. and at least as high as the decomposition temperature of the compound, by which is meant a temperature such that the half life of the free radical-generating catalyst is not greater than 10 hours. Since the half life for each free radical-generating substance is different at different temperatures, the exact temperature to be utilized in a particular reaction will vary. However, persons skilled in the art are well acquainted with the half life vs. temperature data for different free-radical-generating compounds and thus it is within the skill of one familiar with the art to select the particular temperature needed for any particularly free radical-generator. Generally, the operating temperature does not exceed the temperature at which the half life is not more than 10 hours by more than about 150° C. since free radical-generating compounds decompose rapidly under such conditions. However, in some instances, temperatures as high as 300° C. may be utilized, for example, when the reactor is charged with a portion of the alkenyl compound and the polychloro-substituted unsaturated polybasic acid anhydride and the free radical-generating compound in solution in another portion of the alkenyl compound is introduced usually by means of pressure as a liquid, into the reactor which is maintained at the high temperature. The half life of t-butyl perbenzoate is less than 10 hours at about 110° C. and accordingly when this peroxy compound is used as the initiator for this process, the operating temperature is from about 110° to about 300° C., but generally not greater than about 260° C. An operating temperature of from about 130° to about 300° C., and preferably to about 280° C., is used with di-t-butyl peroxide, and from about 75° to about 300° C., but generally not greater than 225° C. with benzoyl peroxide. Little advantage is gained if the temperature is too high even though the reaction is to become more activated in the presence of the free radical-generating compound decomposing at a high rate since decomposition of the polychloro-substituted unsaturated polybasic acid anhydride takes place at a temperature above about 300° C.

The concentration of the initiator which is employed in the process of the present invention may vary over a rather wide range, but for reasons of economics, it is desirable to use lower concentrations of initiators, such as from about 0.1% up to about 10% of the total weight of the alkenyl compound and the polyhalo-substituted unsaturated polybasic acid anhydride charged to the process. The reaction time may vary and may be within the range of from less than 1 minute to several hours, depending upon the reaction conditions of and the half life of the free radical-generating compounds as hereinbefore set forth. Generally speaking, a contact time of at least 10 minutes is preferred.

Examples of alkenyl compounds, the term "alkenyl" as used in the present specification and appended claims referring to both straight or branched chain unsaturated compounds and cyclic unsaturated compounds both of which contain one ethylene linkage, which may be employed as one of the starting materials of the present process will include open chain alkenes containing at least 3 carbon atoms such as propene, 1-butene, 2-butene, 1-pentene, 2-pentene, -hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 5-decene, etc., as well as branched chain isomers thereof; or cycloalkenes such as cyclobutene, cyclopentene, cyclohexene, cycloheptene, cyclooctene, etc. It is also contemplated within the scope of this invention that alkenes and cycloalkenes which possess nonhydrocarbon substituents such as halo-substituents, and particularly chloro- and bromo-substituents, hydroxy, alkoxy, amino, nitro, etc., substituents may also be utilized, some representative examples being 1-, 2-, and 3-chloro-1-propene; 1-, 2-, and 3-bromo-1-propene; α-chloro-1-butene, α-bromo-1-butene, 1-methoxy-1-butene, 1-chloro-1-cyclopentene, 3-bromo-1-cyclopentene, 3-hydroxy-1-cyclohexene, 3-methoxy-1-cyclohexene, etc.

Specific examples of polyhalo-substituted unsaturated polybasic acid anhydrides characterized by the presence of a chlorine atom on each of the doubly-bonded carbon atoms will include dichloromaleic anhydride,
2,3-dichloroglutaconic anhydride,
(1,2-dichlorovinyl)succinic anhydride,
(1,2,2-trichlorovinyl)succinic anhydride,
(2-fluoro-1,2-dichlorovinyl)succinic anhydride,
(2,3-dichloroallyl)succinic anhydride,
(2,3,3-trichloroallyl)succinic anhydride,
(3-fluoro-2,3-dichloroallyl)succinic anhydride,
2-(1,2-dichlorovinyl)glutaconic anhydride,
2-(1,2,2-trichlorovinyl)glutaconic anhydride,
2-(2-bromo-1,2-dichlorovinyl)glutaconic anhydride,
2-(2,3-dichloroallyl)glutaconic anhydride,
2-(2,3,3-trichloroallyl)glutaconic anhydride,
2-(3-bromo-2,3-dichloroallyl)glutaconic anhydride,
3-(1,2-dichlorovinyl)glutaconic anhydride,
3-(1,2,2-trichlorovinyl)glutaconic anhydride,
3-(2,3-dichloroallyl)glutaconic anhydride,
3-(2,3,3-trichloroallyl)glutaconic anhydride.

It is also contemplated within the scope of this invention that polychloro-substituted anhydrides of monobasic unsaturated carboxylic acids such as 2,3-dichloroacrylic anhydride may be also used, although not necessarily with equivalent results. It is to be understood that the aforementioned specific examples of alkenyl compounds and polyhalo, particularly polychloro, substituted unsaturated polybasic acid anhydrides are only representative of the class of compounds which may be employed, and that the present invention is not necessarily limited thereto.

The process of this invention may be effected in any suitable manner and may comprise either a batch or continuous type operation. For example, when a batch type operation is used, a quantity of the starting materials comprising the alkenyl compound and the polyhalo-substituted unsaturated polybasic acid anhydride which contains at least one chlorine atom on each of the doubly-bonded carbon atoms is placed in an appropriate apparatus along with the free radical-generating compound. When utilizing alkenyl compounds which are gaseous in nature, the reaction vessel will comprise a pressure-resistant vessel. In addition it is also contemplated that this type of vessel may be used when the alkenyl compound is liquid in nature, and superatmospheric pressures are employed. The vessel is sealed and an inert gas such as nitrogen may be pressed in until the desired initial operating pressure is reached. The aforementioned operating pressure may range from 1 to 100 atmospheres or more and is usually that amount of pressure which is necessary to maintain a major portion of the reactants in the liquid phase. However, as hereinbefore set forth, when utilizing alkenyl compounds which are gaseous in nature, the operating pressure may be that which is supplied by the alkenyl compound alone. The reaction vessel and contents thereof are then heated to a predetermined operating temperature which is in a range hereinbefore set forth and maintained thereat for the predetermined residence time which has been previously discussed. Upon completion of the residence period, heating is discontinued, the autoclave and contents thereof are allowed to return to room temperature, the excess pressure is discharged and the vessel is opened. The liquid product is recovered and subjected to conventional means of separation and purification including extraction, washing, drying, evaporation, crystallization, distillation, usually under reduced pressures, etc., whereby the desired product comprising the alkenyl substituted halogenated unsaturated polybasic acid anhydride is recovered.

It is also contemplated within the scope of this invention that the process may be effected in a continual manner of operation. When such a type of operation is to be employed, the starting materials comprising the alkenyl compound and the compound and the polyhalo-substituted unsaturated polybasic acid anhydride are continuously charged to the reaction zone which is maintained at the proper conditions of temperature and pressure. In addition, the free radical-generating compound is also charged thereto through a separate line or, if so desired, it may be admixed with one or both of the starting materials prior to entry into said reactor and charged thereto along with said reactant.

Upon completion of the desired residence time, the reactor effluent is continuously withdrawn and subjected to operation steps similar to those hereinbefore set forth, whereby the desired product is recovered and removed to storage while any unreacted starting materials are recycled to form a portion of the feed stock.

Examples of alkenyl-substituted halogenated unsaturated polybasic acid anhydrides which may be prepared according to the process of this invention will include 3-chloro-2-allylmaleic anhydride,
3-chloro-2-(1-methylallyl)maleic anhydride,
3-chloro-2-(1-ethylallyl)maleic anhydride,
3-chloro-2-(1-propylallyl)maleic anhydride,
3-chloro-(2-cyclohexenyl)maleic anhydride,
3-chloro-2-allylglutaconic anhydride,
3-chloro-2-(1-methylallyl)glutaconic anhydride,
3-chloro-2-(1-ethylallyl)glutaconic anhydride,
3-chloro-2-(1-propylallyl)glutaconic anhydride,
3-chloro-(2-cyclohexenyl)glutaconic anhydride, etc. It is to be understood that the aforementioned compounds are only representative of the class of compounds which may be prepared, and that the present invention is not necessarily limited thereto.

In addition to the above set forth compounds, it is also contemplated within the scope of this invention that dialkenyl-substituted unsaturated polybasic acid anhydrides may also be obtained by utilizing a very large excess of the alkenyl reactant over the polyhalo substituted polybasic acid anhydride reactant. Some specific examples of these compounds include 2,3-diallylmaleic anhydride, 2,3-di-(1-methylallyl)maleic anhydride, 2,3-di-(2-cyclohexenyl)maleic anhydride, 2,3-diallylglutaconic anhydride, 2,3-di(1-methylallyl)glutaconic anhydride, 2,3-di(2-cyclohexenyl)glutaconic anhydride, etc.

The following examples are given to illustrate the process of the present invention which, however, are not intended to limit the generally broad scope of the present invention in strict accordance therewith.

EXAMPLE I

In this example, 16 g. (0.10 mol) of dichloromaleic anhydride along with 3 g. (0.02 mol) of di-t-butyl peroxide were placed in the glass liner of a rotating autoclave. Following this, 25 g. (0.60 mol) of propene was charged thereto followed by a sufficient amount of nitrogen so that the initial operating pressure was 30 atmospheres. The autoclave was then heated to a temperature of 130° C. and maintained at a temperature in the range of from 130° to 140° C. for a period of 4 hours, the maximum pressure at this temperature being 40 atmospheres. At the end of the aforementioned 4 hour period, heating was discontinued and the autoclave allowed to return to room temperature, the final pressure at room temperature being 30 atmospheres. The excess pressure was discharged, the autoclave was opened and the product was recovered therefrom.

The product which comprised 18 g. of an amber crystalline wet mass with a somewhat viscous liquid was warmed with water, said process leaving a dark amber lower liquid layer. The aqueous solution was decanted and the oil was washed with a second batch of water. Decantation of water left 8 g. of dark amber oil which was heated with cyclohexane on a steam bath. The resultant cyclohexane solution was submitted to a mass spectrometric analysis. This analysis indicated a major component at m/e 173 and 175 and had $Cl^{35}$ and $Cl^{37}$ indicating that the compound was 3-chloro-2-allylmaleic anhydride.

EXAMPLE II

A mixture of 16 g. (0.1 mol) of dichloromaleic anhydride and 3 g. (0.02 mol) of di-t-butyl peroxide is placed in the glass liner of a rotating autoclave which is thereafter sealed. Thereafter 28 g. (0.5 mol) of 1-butene is charged thereto along with a sufficient amount of nitrogen so that the initial operating pressure is 30 atmospheres. The autoclave is thereafter heated to a temperature of 130° C., the autoclave and contents thereof being maintained at a temperature in the range of from 130° to 140° C. for a period of 4 hours. During this time, the maximum pressure will rise to about 50 atmospheres. At the end of the 4 hour reaction period, heating is discontinued and the autoclave is allowed to return to room temperature, the final pressure at room temperature being 30 atmospheres. The excess pressure is discharged, the autoclave is opened and the reaction product is recovered therefrom. The reaction product is then treated in a manner similar to that set forth in Example I above, that is, washed with water, the aqueous solution is removed, and the liquid product again treated with a second batch of water. This second batch of water is also removed and the liquid product heated with cyclohexane. Analysis of the resultant product will disclose the presence of the desired product comprising 3-chloro-2-(1-methylallyl)maleic anhydride.

EXAMPLE III

In like manner a mixture of 16 g. (0.1 mol) of dichloromaleic anhydride, 41 g. (0.5 mol) of cyclohexene and 2 g. (0.01 mol) of benzoyl peroxide is placed in the glass liner of a rotating autoclave which is thereafter sealed. Nitrogen is pressed in until an initial operating pressure of 30 atmospheres is reached and the reactor is then heated to a temperature of 80° C. The autoclave is maintained at a temperature in the range of from 80° to 100° C. for a period of 6 hours during which time, the maximum pressure will reach about 40 atmospheres. At the end of the 6 hour period, heating is discontinued, the autoclave is allowed to return to room temperature, the excess pressure is discharged and the autoclave is opened. The reaction product is recovered and subjected to separation and purification means similar to that hereinbefore set forth, whereby the desired product comprising 3 - chloro-2-(2-cyclohexenyl)maleic anhydride is recovered therefrom.

EXAMPLE IV

A mixture comprising 22 g. (0.12 mol) of 2,3-dichloroglutaconic anhydride and 3 g. (0.02 mol) of di-t-butyl peroxide is placed in the glass liner of a rotating autoclave which is thereafter sealed and 21 g. (0.5 mol) of propene is charged thereto. Following this, a sufficient amount of nitrogen is charged to the reactor so that an initial operating pressure of 30 atmospheres is reached. The autoclave and contents thereof are then heated to a temperature of 130° C. and maintained at a temperature in a range of from 130° to 140° C. for a reaction period of 4 hours. During this 4 hour period, the maximum pressure in the autoclave will reach about 50 atmospheres. At the end of the aforementioned 4 hour period, heating is discontinued, the autoclave is allowed to return to room temperature and the operating pressure will fall to the initial level, that is, 30 atmospheres. The excess pressure discharged, the autoclave is opened, and the reaction product is recovered therefrom. After washing with water and decanting the aqueous solution, the product is taken up with cyclohexane, heated and the desired product comprising 3-chloro-2-allylglutaconic anhydride is recovered therefrom.

EXAMPLE V

In this example 18 g. (0.1 mol) of 2,3-dichloroglutaconic anhydride and 2 g. (0.01 mol) of benzoyl peroxide are placed in an autoclave which is thereafter sealed and 28 g. (0.5 mol) of 1-butene is charged thereto. Following this, nitrogen is charged until an initial operating pressure of 30 atmospheres is reached and the autoclave is then heated to a temperature of 80° C. The autoclave is maintained at a temperature in the range of from 80° to 100° C. for a period of 6 hours, during which time the maximum pressure reached approximately 40 atmospheres. After completion of the desired reaction period, heating is discontinued, the autoclave is allowed to return to room tempertaure and the excess pressure which will fall to 30 atmospheres is discharged. The autoclave is opened and the reaction product is recovered therefrom. Treatment of the reaction product in a manner similar to that set forth in the above examples will permit the recovery of the desired product which is 3-chloro-2-(1-methylallyl)glutaconic anhydride.

I claim as my invention:

1. A process for the preparation of an alkenyl-substituted halogenated alpha,beta olefinically unsaturated dicarboxylic anhydride which comprises reacting an alkene selected from the group consisting of $C_4$ to $C_8$ cycloalkene having one ethylene linkage and $C_3$–$C_{10}$ open chain alkene having one ethylene linkage with a polyhalo-substituted alpha,beta olefinically unsaturated dicarboxylic anhydride characterized by the presence of at least one chlorine atom on each of the doubly-bonded carbon atoms selected from the group consisting of dichloromaleic anhydride and dichloroglutaconic anhydride in the presence of a free radical-generating compound at condensation conditions, and recovering the resultant alkenyl substituted halogenated alpha,beta olefinically unsaturated dicarboxylic anhydride.

2. The process as set forth in claim 1 in which said condensation conditions include a temperature in the range of from about 50° to about 300° C. and at least as high as the decomposition temperature of said free radical-generating compound.

3. The process as set forth in claim 1 in which said free radical-generating compound is an organic peroxide.

4. The process as set forth in claim 3 in which said organic peroxide is di-t-butyl peroxide.

5. The process as set forth in claim 3 in which said organic peroxide is benzoyl peroxide.

6. A process as set forth in claim 1 in which said alkene is propene, said polyhalo-substituted alpha,beta olefinically unsaturated dicarboxylic anhydride is dichloromaleic anhydride and said alkenyl-substituted halogenated alpha, beta olefinically unsaturated dicarboxylic anhydride is 3-chloro-2-allylmaleic anhydride.

7. The process as set forth in claim 1 in which said alkene is 1-butene, said polyhalo-substituted alpha,beta olefinically unsaturated dicarboxylic anhydride is dichloromaleic anhydride and said alkenyl-substituted halogenated alpha,beta olefinically unsaturated dicarboxylic anhydride is 3-chloro-2-(1-methylallyl) maleic anhydride.

8. The process as set forth in claim 1 in which said alkene is cyclohexene, said polyhalo-substituted alpha,beta olefinically unsaturated dicarboxylic anhydride is dichloromaleic anhydride and said alkenyl-substituted halogenated alpha,beta olefinically unsaturated dicarboxylic anhydride is 3-chloro-2-(2-cyclohexenyl)maleic anhydride.

9. The process as set forth in claim 1 in which said alkene is propene, said polyhalo-substituted alpha,beta olefinically unsaturated dicarboxylic anhydride is 2,3-dichloroglutaconic anhydride and said alkenyl substituted halogenated alpha,beta olefinically unsaturated dicarboxylic anhydride is 3-chloro-2-allylglutaconic anhydride.

10. The process as set forth in claim 1 in which said alkene is 1-butene, said polyhalo-substituted alpha,beta olefinically unsaturated dicarboxylic anhydride is 2,3-dichloroglutaconic anhydride and said alkenyl substituted halogenated alpha,beta olefinically unsaturated dicarboxylic anhydride is 3 - chloro-2-(1-methylallyl)glutaconic anhydride.

References Cited

UNITED STATES PATENTS 3,474,110   10/1969   Merijan et al. _____ 260—346.8

ALEX MAZEL, Primary Examiner

B. DENTZ, Assistant Examiner

U.S. Cl. X.R.

260—346.8 R, 346.6, 346.3